Figure 1:
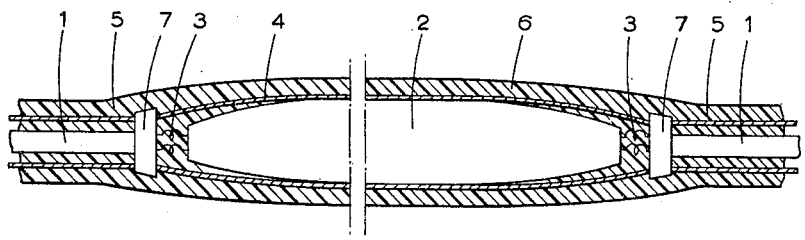

Oct. 31, 1961   R. MONELLI   3,006,792
TELECOMMUNICATION SUBMARINE ELECTRIC CABLES
Filed Aug. 7, 1959

RICCARDO MONELLI
INVENTOR
by Eugene E. Stevens
ATTORNEY

United States Patent Office 3,006,792
Patented Oct. 31, 1961

3,006,792
TELECOMMUNICATION SUBMARINE
ELECTRIC CABLES
Riccardo Monelli, Milan, Italy, assignor to Pirelli Societa
per Azioni, Milan, Italy
Filed Aug. 7, 1959, Ser. No. 832,358
1 Claim. (Cl. 156—51)

The present invention relates to telecommunication submarine electric cables provided with an antitorsional armoured sheath. Such sheaths are composed of a number of metallic strands, for instance of steel, of high tensile strength, which are arranged parallel to one another and to the axis of the cable, around a circumference, and are held in the desired position by being embedded in a layer of plastic material, for instance, polyethylene, which surrounds and protects the core of the cable in whatever way it is made.

In telecommunication submarine cables an important problem is that of inserting the repeaters provided for amplifying the communication signals. Each of such repeaters may be composed of a single metallic casing, capable of ensuring water-tightness even at a considerable depth and having the shape of a rigid tank or torpedo, or of a set of metallic casings, connected together non-rigidly, so forming a flexible unit.

The rigid repeaters offer a larger space for the installation of their electric and electronic components, but the laying operation requires particular precautions, especially in deep seas, and this sometimes cannot be carried out at all when the sea is rough.

On the other hand the laying of flexible repeaters requires only a slowing down of the laying speed; it is, however, necessary to accommodate all the components in a space which is rather limited cross-sectionally, in order to keep the diameter of the repeater only slightly greater than that of the cable (for instance, in a practical form the diameter of the flexible repeater may be 100 mm. whereas that of the cable is 50 mm.). The limitation in the transverse dimensions of the repeater causes a consequential limitation in the maximum direct supply voltage applicable and thus also in the number of repeaters which can be inserted in a cable of predetermined length.

In practice both the above types of repeater, as used hitherto, are composed of one or more metal casings, considered as units physically distinct from the cable and must be connected to its armouring in a mechanically satisfactory way so as to ensure absolute tightness under water pressures corresponding to the maximum depths required, though they are provided with bushing insulators allowing the connection of the electric conductors of the cable to the electric and electronic devices contained inside the repeater. This difficult problem has been solved in various ways, which are all necessarily complicated, and which require selected materials and very accurate workmanship, resulting in increased cost of the repeaters.

The present invention consists in a telecommunication submarine electric cable having an antitorsional armoured sheath composed of metallic strands of high tensile strength, parallel to one another and to the cable axis, embedded in a mass of material of the class known as plastics, provided with flexible repeaters located in the space surrounded by the armour strands, continued for this purpose over each of the said repeaters, and embedded, together with the said strands, in a mass of impervious plastic material, which is joined with complete continuity to the plastic mass wherein the armour strands surrounding the cable core on each side of each repeater are embedded. The said cable core is generally constituted by a coaxial pair. The use of such a cable ensures maximum service safety, as well as extremely simple construction and facilitates the laying operation.

The invention also consists in the method by which the flexible repeaters are inserted in telecommunication submarine cables as described above.

The invention will now be more fully described with the air of the accompanying drawing, which represents, by way of example only, and in longitudinal section, two different ways of carrying it into effect.

Figure 2:
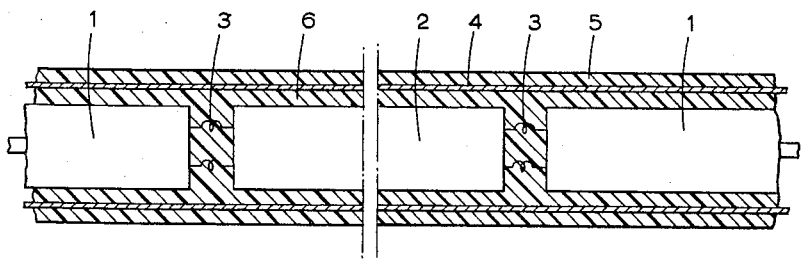
Figure 3:
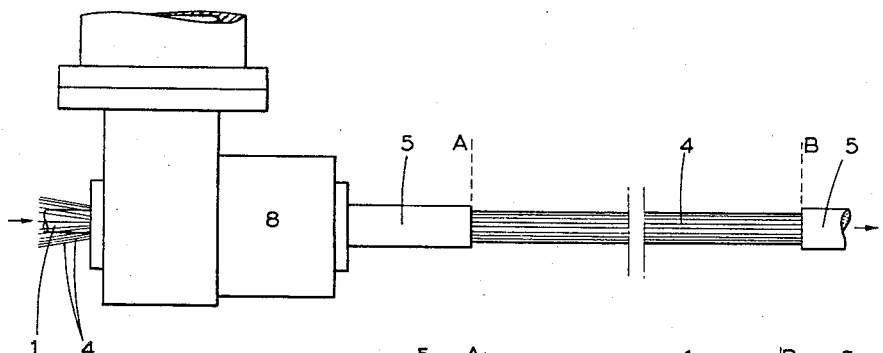
Figure 4:
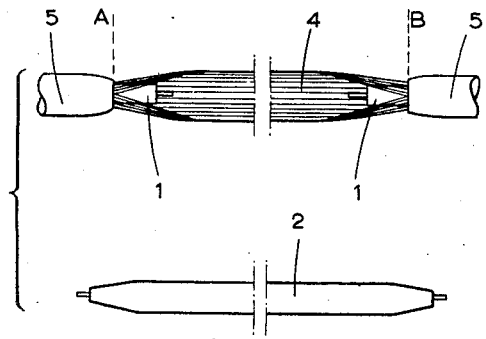

In the drawing:
FIG. 1 is a broken longitudinal sectional view of a cable embodying my invention;
FIG. 2 is a view similar to FIG. 1 but showing a repeater and cable core of the same diameter;
FIG. 3 illustrates means for applying sheath plastic to a cable; and
FIG. 4 is a group view showing firstly sheath strands spread to expose a core gap, and secondly a repeater for insertion in said gap.

Referring to FIGURE 1, the reference numeral 1 indicates the ends of two cable lengths, each comprising a coaxial pair; between the ends 1 there is located a flexible repeater 2, connected to the two conductors of the coaxial pair through flexible conductors 3; 4 indicates the longitudinal strands of the armour and 5 shows the embedding sheath of the cable core. As can be seen, the repeater 2 is contained in the space surrounded by the armour strands 4 and is embedded, together with them, in a mass 6 of impervious plastic material, which is joined, with complete continuity, to the sheath 5, and may be made of the same material.

The repeater 2 has a greater diameter than that of the cable core, so that the armour strands 4, in order to pass over the repeater, are spread out into a cone; as can be seen, in the zones where this spreading occurs, the armour strands are surrounded by check rings 7 in the shape of a frustum of a cone.

FIGURE 2, in which the parts corresponding to those in FIGURE 1 are indicated by the same reference numerals, shows a construction suitable when the diameter of the repeater is not greater than that of the cable core. In this case, it is obviously not necessary to spread out by outward bending the armour strands, which follow a straight line over the repeater; correspondingly the diameter of the cable section remains constant throughout.

In a construction according to the present invention the same plastic material which forms the cable sheath serves to ensure water-tightness; also the problem of connecting the cable armour to the repeater casing is completely overcome, as the armoured sheath which protects the cable core continues over the repeater without interruption or joints. Also the problem of the tension stresses exerted on the repeater and on its connections with the cable conductors no longer exists, as these stresses are directly absorbed by the armour strands which lie over the repeater without any interruption.

In the application of the present invention, the laying operations are considerably simpler as compared with the laying of conventional cables having flexible repeaters; moreover, where the diameter of the repeater is not greater than that of the cable core, as in FIGURE 2, the laying operation does not differ at all from that of a normal cable without repeaters.

The insertion of flexible repeaters in cables provided with antitorsional armoured sheaths according to the present invention is characterised by its great simplicity. Two modes of procedure which may be advantageously adopted are described below.

According to one of these methods, illustrated in FIGURES 3 and 4, suitable for use in the case of constructions shown in both FIGURES 1 and 2, the plastic material for the sheath is extruded over the cable core 1 entering the head 8 of extrusion apparatus together with the armouring strands 4; the cable core provided with its sheath 5 emerges from the opposite side of the head and moves in the direction shown by the arrow. Discharge of plastic material from the head 8 is discontinued over the portion A—B in which the repeater is to be inserted within the space defined by the armouring strands; consequently the portion A—B comprises only the cable core 1 and the bare armouring strands 4 which are disposed longitudinally about the core. In FIGURE 4 there is seen a length of cable comprising the portion A—B after cutting and removing the core 1, the ends of the sheath 5 being slightly tapered to facilitate adequate adhesion of the mass 6 which, at the end of the process, will be hot moulded around the portion A—B. FIGURE 4 also illustrates the position of the armouring strands 4, spread out with respect to one another by bending them outwardly, with the application, if required, of check rings 7, not shown, when the repeater 2, represented separately below, is inserted between them and connected to the ends of the cable cores 1.

According to the other mode of procedure, which can only be adopted in the case illustrated in FIGURE 2, namely, when the diameter of the flexible repeater is not greater than that of the cable core, the repeater is inserted between the ends of the cable core and electrically connected to the corresponding cable conductors, and then the plastic sheath and the armour are placed on the structure formed by the cable core and the repeaters inserted therein.

What I claim and desire to secure by Letters Patent of the United States is:

In the manufacture of an armoured repeater-incorporating telecommunication submarine cable which is characterized by a coaxial conductor pair-providing core, the method which comprises spacedly surrounding a continuous length of core with flexible core axis-paralleling armouring wires of high tensile strength, simultaneously travelling said core and armouring wires longitudinally while extrudingly and successively embedding corresponding lengths of said core and wires in sheath-providing plastic, interrupting the supply of plastic while the core and wires are still travelling whereby to provide a sheath gap exposing said core and wires, next temporarily spreading said wires and removing a section of said core at the site of said sheath gap, the insertion of a repeater in said gap and the electrical connection of the repeater to the gap-defining ends of said core conductors, returning said wires to their initial position surrounding said core, and finally applying a gap-covering plastic sheathing to said wires and repeater.

References Cited in the file of this patent
UNITED STATES PATENTS

| 25,739 | Johnson | Oct. 11, 1859 |
| 268,059 | Waring | Nov. 28, 1882 |
| 2,292,358 | Bishop | Aug. 11, 1942 |
| 2,803,694 | Pouzet | Aug. 20, 1957 |
| 2,810,669 | Heupgen | Oct. 22, 1957 |

FOREIGN PATENTS

| 2,402 | Great Britain | of 1859 |
| 32,983 | Germany | Sept. 12, 1885 |

OTHER REFERENCES

Raydt et al.: German application 1,044,916, printed Nov. 27, 1958 (Kl. 21c 7/50).

Transactions of the A.I.E.E. (publication), pages 565, 566, volume 70, 1951.